(12) United States Patent  (10) Patent No.: US 7,738,863 B2
Saarikivi et al.  (45) Date of Patent: Jun. 15, 2010

(54) IP DATACASTING MIDDLEWARE

(75) Inventors: Tuomo Saarikivi, Helsinki (FI); Kari Karkkainen, Espoo (FI); Martin Jansky, Espoo (FI)

(73) Assignee: Nokia Corporation, Espoo (FI)

( * ) Notice: Subject to any disclaimer, the term of this patent is extended or adjusted under 35 U.S.C. 154(b) by 898 days.

(21) Appl. No.: 11/410,102

(22) Filed: Apr. 25, 2006

(65) Prior Publication Data

US 2007/0050820 A1  Mar. 1, 2007

Related U.S. Application Data

(60) Provisional application No. 60/710,874, filed on Aug. 25, 2005.

(51) Int. Cl.
*H04W 24/00* (2009.01)
(52) U.S. Cl. .................. 455/424; 455/425; 455/414.2; 455/403; 455/422.1; 455/426.2; 455/432.3
(58) Field of Classification Search ................ 455/424, 455/425, 414.2, 403, 422.1, 426.2, 432.3
See application file for complete search history.

(56) References Cited

U.S. PATENT DOCUMENTS 6,085,079 A * 7/2000 Tabeta ........................ 455/403

FOREIGN PATENT DOCUMENTS

| EP | 0957597 | 11/1999 |
|---|---|---|
| EP | 1372296 | 12/2003 |
| EP | 1379054 | 1/2004 |
| WO | 03056828 | 7/2003 |

OTHER PUBLICATIONS

International Preliminary Report on Patentability for International Application No. PCT/IB2006/001156, mailed Mar. 6, 2008, 7 pages.

* cited by examiner

*Primary Examiner*—Nghi H Ly
(74) *Attorney, Agent, or Firm*—Banner & Witcoff, Ltd.

(57) ABSTRACT

The invention provides a middleware component usable in a mobile terminal device, where the middleware component mediates between an application program and network interfaces and/or hardware to manage the interaction between disparate applications across heterogeneous platforms. The middleware component coordinates scanning for available broadcast, multicast, and/or conditional access platforms, networks, and/or services, as well as obtaining electronic service guide (ESG) data for the available services. The middleware component may use a variety of discovery protocols to identify services, and may use security protocols to manage authorized access to received services. When incorporated into a mobile terminal device, the middleware may interface with multiple radios to establish communications over on or more data networks in addition to receiving data via the broadcast network.

32 Claims, 7 Drawing Sheets

IP DATACASTING MIDDLEWARE

RELATED APPLICATIONS

This application claims the benefit of U.S. Provisional Patent Application No. 60/710,874, filed Aug. 25, 2005, which application is incorporated entirely herein by reference.

FIELD OF THE INVENTION

The invention relates generally to communications networks. More specifically, the invention relates to Internet Protocol (IP) DataCasting software.

BACKGROUND OF THE INVENTION

Generally, an Electronic Service Guide (ESG) enables a terminal to communicate what services are available to end users and how the services may be accessed. ESG fragments are independently existing pieces of the ESG. Traditionally, ESG fragments comprise XML documents or fragments of XML documents, but more recently they have encompassed a vast array of items, such as for example, a SDP (Session Description Protocol) description, textual file, or an image. The ESG fragments describe one or several aspects of currently available (or future) services or broadcast programs. Such aspects may include for example: free text description, schedule, geographical availability, price, purchase method, genre, and supplementary information such as preview images or clips. Audio, video and other types of data comprising the ESG fragments may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (UDP). ESG fragments may also be transmitted using ALC and FLUTE protocols. Data is often transmitted through the Internet addressed to a single user. It can, however, be addressed to a group of users, commonly known as multicasting. In the case in which the data is addressed to all users it is called broadcasting.

One way of broadcasting data is to use an IP data casting (IPDC) network. IPDC is a combination of digital broadband broadcast and Internet Protocol. Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an electronic service guide (ESG). One example used in digital video broadcasting (DVB) streams is an electronic program guide (EPG). One type of DVB is Digital Video Broadcasting-Handheld (DVB-H), a technology that increases the capabilities and services available on small handheld devices, such as mobile telephones. The DVB-H is designed to deliver data to a battery-powered terminal device.

Mobile battery-powered terminal devices come in many shapes and sizes, with differing software, differing user interfaces, and differing hardware capabilities. For example, some mobile terminal devices may have different types of hardware and/or software radios than other mobile terminal devices, e.g., WLAN transceivers, FM radio receivers, DVB-H receivers, telecommunications transceivers, etc. Other devices may include different software applications than other devices, and use different user interfaces. The variety of hardware and software configurations makes it difficult to efficiently and uniformly implement DVB and other broadcast and/or multicast services on a mobile terminal device.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, an aspect of the present invention is directed to middleware usable in a mobile terminal device, where the middleware is able to control a radio receiver capable of receiving a broadcast, multicast, or conditional access transmission. The middleware component may include an interface layer having one or more application program interfaces (API) through which a broadcast experience application (e.g., a real-time mobile TV player) provides control information to the middleware component, and through which the middleware component returns platform information to the broadcast experience application. The middleware component may also include a hardware adaptation layer through which the middleware component provides control information to the radio receiver and/or hardware devices, and through which the middleware component receives input from the radio receiver and other hardware devices. A radio management module may control discovery of broadcasting services using a discovery protocol for finding broadcast services via the radio receiver. An electronic service guide (ESG) module may manage ESG data by performing an ESG service discovery protocol to obtain ESG data.

According to another aspect of the invention, a mobile terminal may receive broadcast data under the management of a middleware component in the mobile terminal device, using a method including steps, performed by the middleware component, initiating the powering on of a radio capable of wirelessly receiving data from a broadcast network, instructing the radio to scan a radio spectrum receivable by the radio for an available broadcast platform, recording in a platform database PSI/SI data corresponding to the available broadcast network, tuning the radio to receive the available broadcast network, providing a platform identifier to an electronic service guide (ESG) module of the middleware component, and the ESG module downloading ESG data corresponding to the platform identifier.

Those of skill in the art will appreciate that one or more aspects of the invention may be used with digital multicarrier systems and networks. That is, while aspects of the invention may be described with respect to DVB-H systems, it is also applicable to other digital mobile broadcast systems such as, for example, T-DAB, T/S-DMB, ISDB-T, and ATSC, proprietary systems such as Qualcomm MediaFLO/FLO, and non-traditional systems such 3GPP MBMS (Multimedia Broadcast/Multicast Services) and 3GPP2 BCMCS (Broadcast/Multicast Service).

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
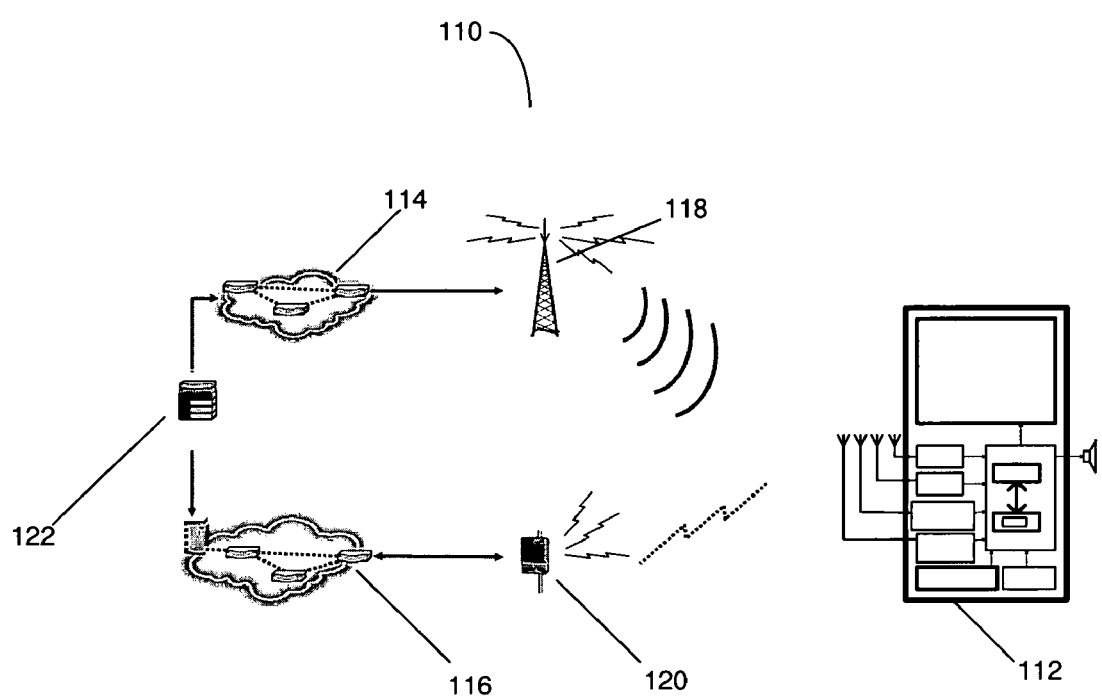
FIG. 1 illustrates a block diagram of a wireless communication system in which various aspects of the present invention may be implemented.

The present invention may be utilized across a broad array of networks and communication protocols. FIG. 1 illustrates an example of a wireless communication system 110 in which the systems and methods of the invention may be employed. One or more network-enabled mobile battery-powered terminal devices 112, such as a personal digital assistant (PDA), cellular telephone, mobile terminal, personal video recorder, portable television, personal computer, digital camera, digital camcorder, portable audio device, portable radio, or combinations thereof, are in communication with a service source 122 through a broadcast network 114 and/or cellular network 116. Battery power may be provided by various sources such as traditional batteries, hybrid energy systems, fuel cells, etc. The mobile terminal/device 112 may comprise a digital broadcast receiver device, described below. The service source 122 may be connected to several service providers that may provide their actual program content or information or description of their services and programs to the service source that further provides the content or information to the mobile device 112, which may be used and/or displayed as an electronic service guide for users to select their services and programs. The several service providers may include but are not limited to one or more television and/or digital television service providers, AM/FM radio service providers, SMS/MMS push service providers, Internet content or access providers, news and/or information services, and the like.

The broadcast network 114 may include a radio transmission of IP data casting over DVB-H. The broadcast network 114 may broadcast a service such as a digital or analog television signal and supplemental content related to the service via a transmitter 118. The broadcast network may also include a radio, television or IP data casting broadcasting network. The broadcast network 114 may also transmit supplemental content which may include a television signal, audio and/or video streams, data streams, video files, audio files, software files, and/or video games. In the case of transmitting IP data casting services, the service source 122 may communicate actual program content to user device 112 through the broadcast network 114 and additional information such as user right and access information for the actual program content through the cellular network 116.

The mobile device 112 may also contact the service source 122 through the cellular network 116. The cellular network 116 may comprise a wireless network and one or more base transceiver station transmitter/receivers 120. The cellular network may include a second/third-generation (2G/3G) cellular data communications network, a Global System for Mobile communications network (GSM), or other wireless communication network such as a WLAN network. Other mobile communications networks may be used as they are developed, e.g., 3.5G and other future communications networks.

Mobile terminal device 112 may communicate with other networks as well, such as other broadcasting networks, as the mobile terminal devices moves geographically. Each network with which the mobile terminal device 112 communicates may comprise one or more platforms, wherein a platform is understood as a set of services provided by one service operator. The services may include different types of realtime content such as ordinary television and radio programs and different types of non-realtime content. A (broadcast) network is here understood as using one radio technology, e.g. DVB-H, FLO, DAB, DMB. One platform may be broadcast or multicast in one or more networks, which means that the same content may be delivered using different radio technologies. For example, a mobile terminal device having a DVB-H receiver may tune to one or more radio channels (frequencies), each of which may differ from the others in terms of bandwidth, number of subcarriers, modulation types, etc., in order to provide content from a content service provider. In DVB-H, bandwidths may include 5, 6, 7, and 8 MHz, the number of subcarriers may include 2048 (2 K system), 4096 (4 K system), and 8192 (8 K system), and examples of modulation include QPSK, 16-QAM, and 64-QAM.

According to an aspect of the invention, mobile device 112 may comprise a wireless interface configured to send and/or receive digital wireless communications within cellular network 116. The information received by mobile device 112 through the cellular network 116 or broadcast network 114 may include user selection, applications, services, electronic images, audio clips, video clips, and/or other messages. As part of cellular network 116, one or more base stations (not shown) may support digital communications with receiver device 112 while the receiver device is located within the administrative domain of cellular network 116.

Figure 2:
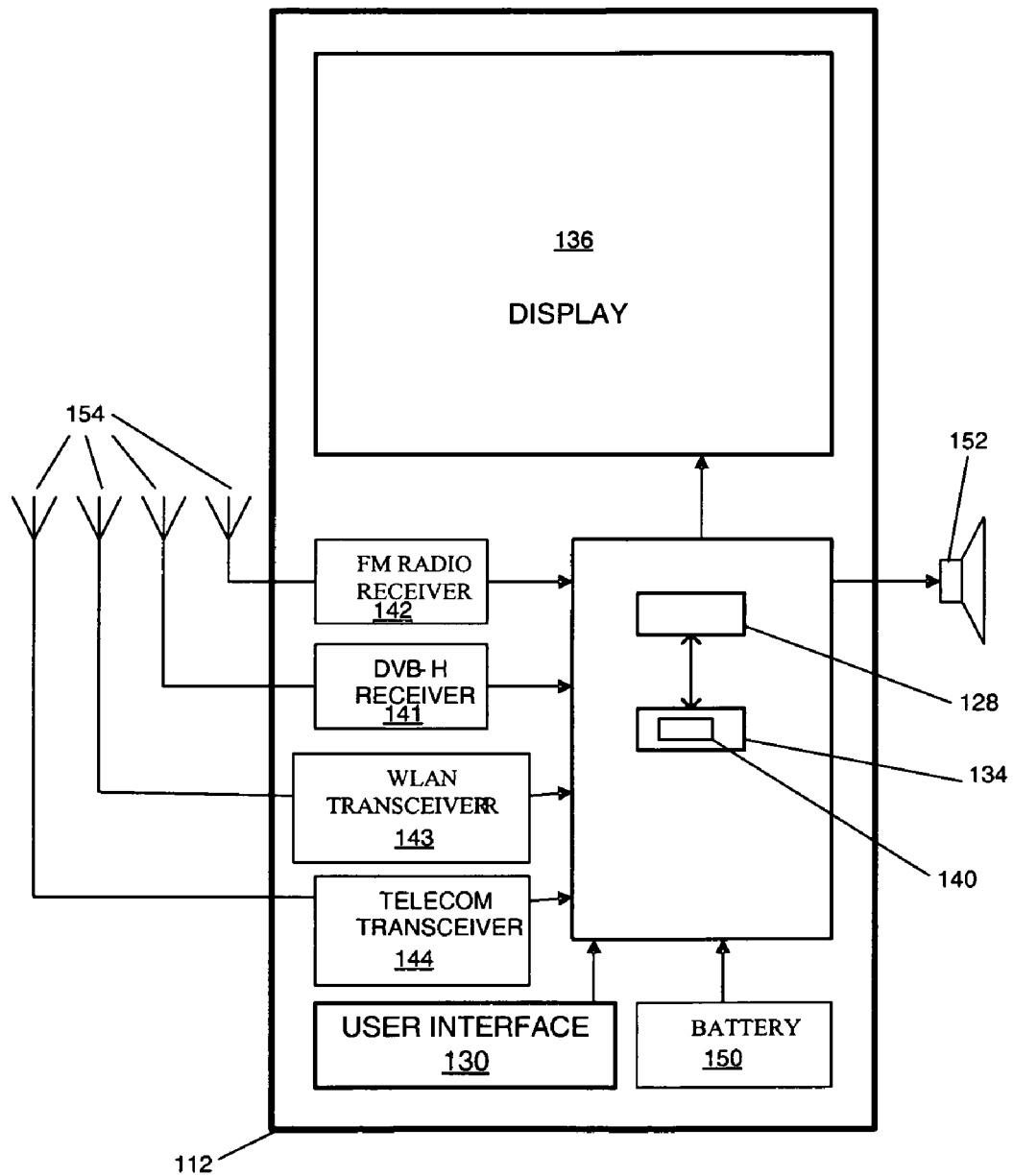
FIG. 2 illustrates a block diagram of a mobile terminal in accordance with an aspect of the present invention.

As shown in FIG. 2, mobile device 112 may include processor 128 connected to user interface 130, memory 134 and/or other storage, and display 136. Mobile device 112 may also include battery 150, speaker 152 and antennas 154. User interface 130 may further include a keypad, touch screen, voice interface, one or more arrow keys, joy-stick, data glove, mouse, roller ball, touch screen, or the like.

Computer executable instructions and data used by processor 128 and other components within mobile device 112 may be stored in a computer readable memory 134. The memory may be implemented with any combination of read only memory modules or random access memory modules, optionally including both volatile and nonvolatile memory and optionally being detachable. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process transmissions based on the Digital Video Broadcast (DVB) standard, such as DVB-H or DVB-MHP, through a specific DVB receiver 141. Additionally, mobile device 112 may also be configured to receive, decode and process transmissions through FM/AM radio receiver 142, WLAN transceiver 143, and telecommunications transceiver 144. In one aspect of the invention, mobile device 112 may receive radio data stream (RDS) messages. Mobile device 112 may be equipped with other receivers/transceivers, e.g., one or more of a Digital Audio Broadcasting (DAB) receiver, a Digital Radio Mondiale (DRM) receiver, a Forward Link Only (FLO) receiver, a Digital Multimedia Broadcasting (DMB) receiver, etc. Hardware may be combined to provide a single receiver that receives and interprets multiple formats and transmission standards, as desired. That is, each receiver in a mobile terminal device may share parts or subassemblies with one or more other receivers in the mobile terminal device, or each receiver may be an independent subassembly.

In an example of the DVB standard, one DVB 10 Mbit/s transmission may have 200, 50 kbit/s audio program channels or 50, 200 kbit/s video (TV) program channels. The mobile device 112 may be configured to receive, decode, and process transmission based on the Digital Video Broadcast-Handheld (DVB-H) standard or other DVB standards, such as DVB-MHP, DVB-Satellite (DVB-S), DVB-Terrestrial (DVB-T) or DVB-Cable (DVB-C). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting-Terrestrial), DAB (Digital Audio Broadcasting), DMB (Digital Multimedia Broadcasting) or DIRECTV. Additionally, the digital transmission may be time sliced, such as in DVB-H technology. Time-slicing may reduce the average power consumption of a mobile terminal and may enable smooth and seamless handover. Time-slicing consists of sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation.

Figure 3:
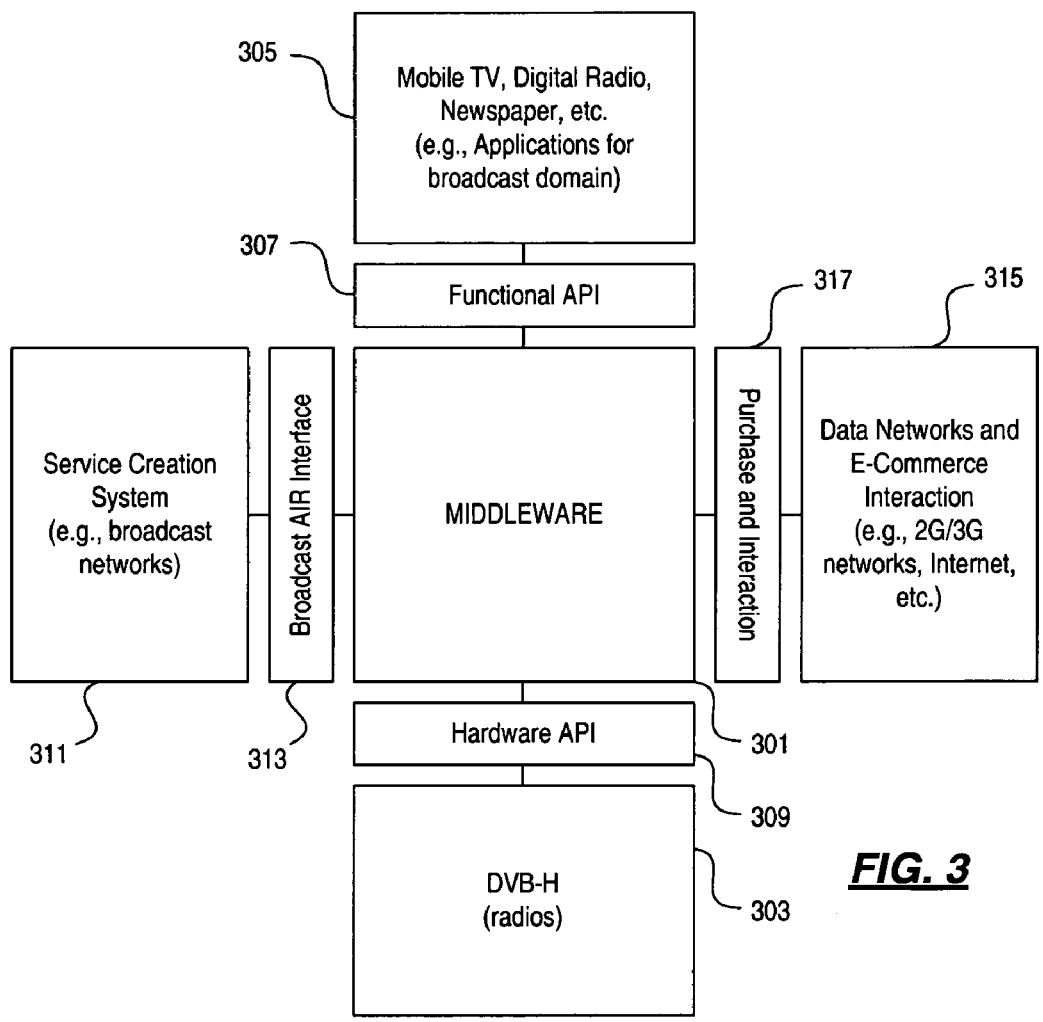
FIG. 3 illustrates a block interface diagram according to an illustrative aspect of the invention.

FIG. 3 illustrates a block diagram of a software middleware component 301 for implementing IP datacasting according to an illustrative aspect of the invention. Middleware generally refers to a communications layer that allows applications to interact across hardware and network environments. Middleware may also refer to a piece of software that sits between two or more types of software and translates information between them, or to software that mediates between an application program and a network to manage the interaction between disparate applications across heterogeneous platforms.

Middleware component 301 may coordinate communication, data, messages, and user interaction between hardware 303 of a mobile terminal device and one or more broadcast experience applications 305 executing on the mobile terminal device as directed by a user of the mobile terminal device. Middleware component 301 interprets and binds together different subsystems and applications in the mobile terminal device to enhance a user's broadcast (and/or multicast, conditional access, etc.) reception experience. Middleware component 301 may expose a functional API 307 through which broadcast experience application 305 interacts with middleware component 301. Middleware component 301 may further expose a hardware API 309 through which middleware component 301 communicates with hardware 303 for device management and adaptation purposes. The middleware component may also manage interaction with service creation systems 311 via a broadcast AIR interface 313. AIR interface 313 may include a collection of protocols and formats used in the broadcast signal. The interface 313 may be an Open Air Interface (OAI) that may be used, e.g., for broadcasting ESG data and keystreams. An OAI provides interoperability of mobile broadcast architectures across various platforms. Additional details about OAI can be found on the Internet, e.g., at http://www.mobiletv.nokia.com/solutions/openair/. The AIR interface may further be priority or standards based. For example, the interface may be implemented using DVB Convergence of Broadcast and Mobile Services (CBMS). Details regarding DVB CBMS is publicly available and can be found at http://www.dvb-h-online.org/technology.htm. The middleware component 301 may also interact with data networks 315 via a data interaction API 317 that may be used, e.g., for e-commerce applications using mobile phone networks.

Figure 4:
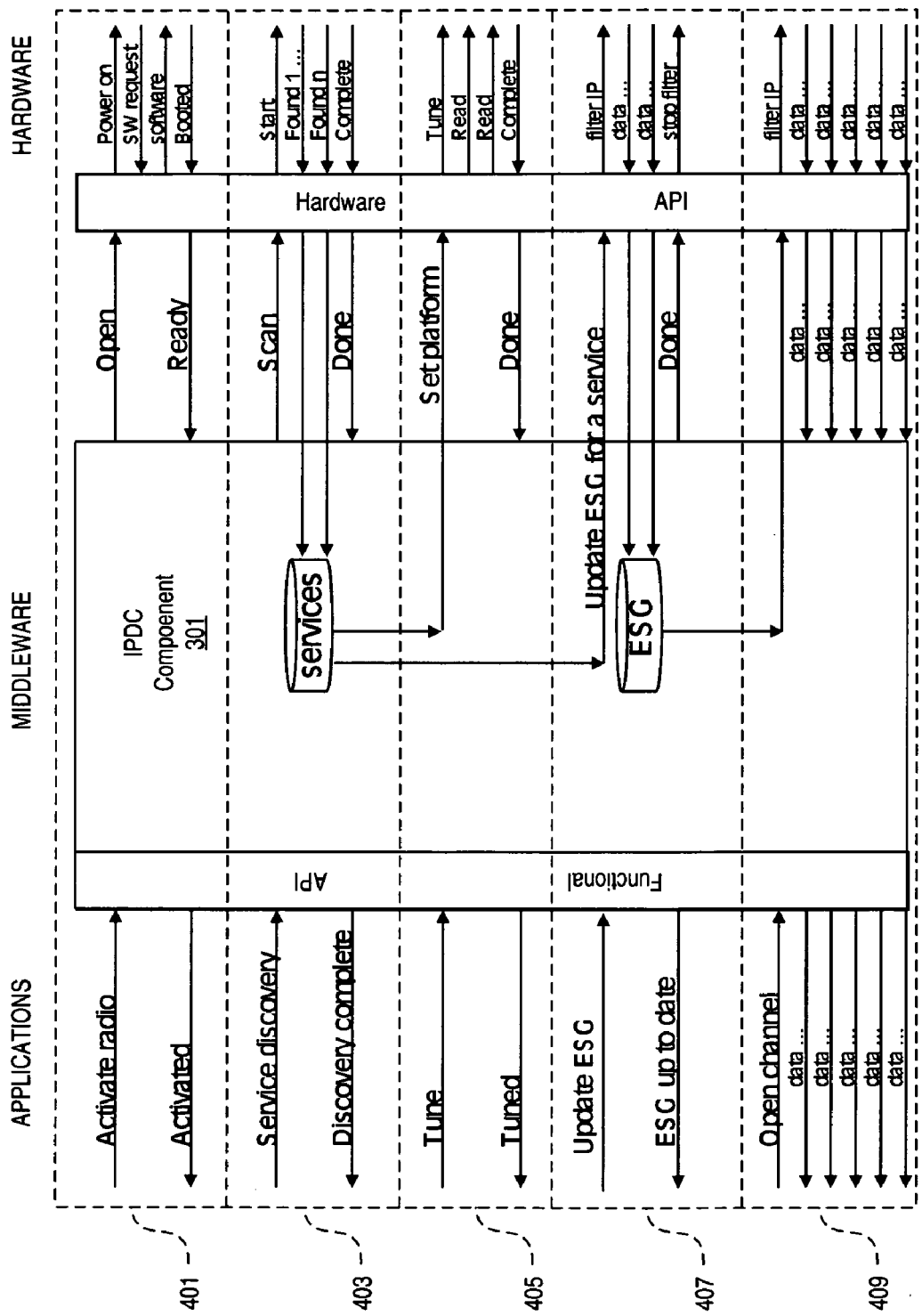
FIG. 4 illustrates a process diagram according to an illustrative aspect of the invention.

FIG. 4 illustrates various functional interfaces (e.g., APIs) and corresponding hardware interfaces of middleware component 301, including a radio activation process 401, a service discovery process 403, a platform tuning process 405, an electronic service guide update process 407, and a channel tuning process 409. Functional APIs may further be divided into functional fragments, wherein each fragment is responsible for one or more tasks including DVB-H management, ESG functions, file transfer processes, scheduling functions and the like. For example, radio activation process 401 and service discover process 403 may be implemented by a DVB-H management fragment of a functional API whereas the electronic service guide update process 407 may be implemented by a ESG fragment of the same or different functional API. The processes shown in FIG. 4 are for illustrative purposes, and those of skill in the art will appreciate that middleware component 301 may support additional processes, API fragments and interfaces in addition to those shown, as described below.

While the invention can be implemented in a variety of systems and architectures, according to one preferable embodiment, aspects described herein are implemented as middleware in an architecture such as that shown in FIG. 4. In FIG. 4 the middleware component 301 exposes one or more APIs to application level programs executing on the mobile terminal device, e.g., broadcast experience applications. Each application level program is written to interface with the middleware component using the exposed APIs as published by the developer of the middleware component. Thus, developers of broadcast experience applications do not need to develop such applications to manage platform information, security keys, etc., as the middleware component manages such issues, as described herein. Middleware component 301 further interfaces with device hardware and software subsystems, e.g., radios, using known or published interfaces for each subsystem.

Figure 5:
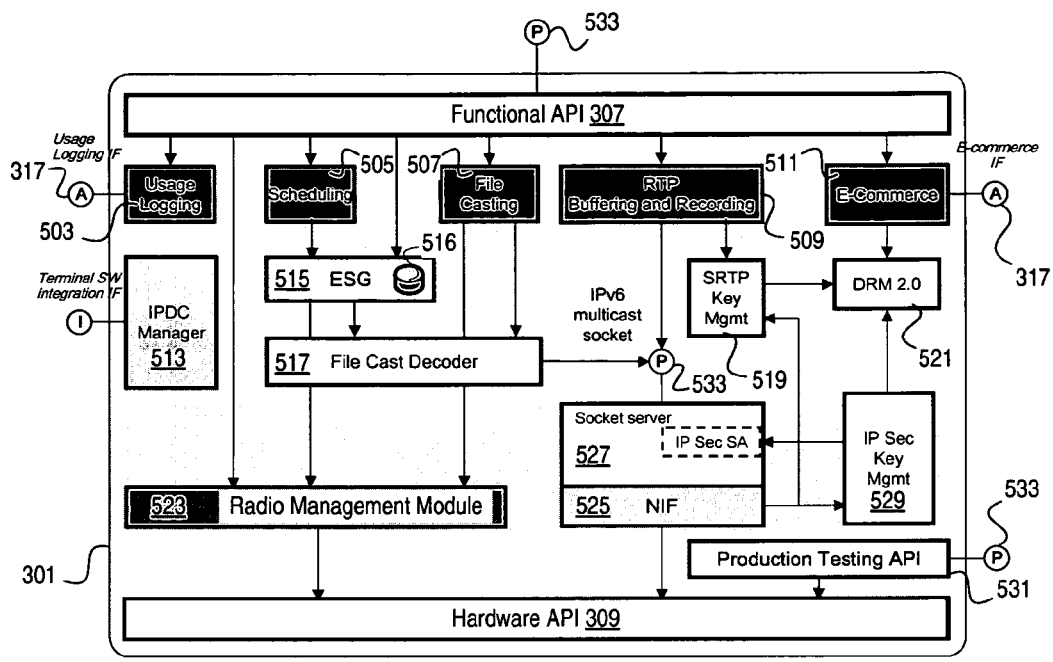
FIG. 5 illustrates a block functionality diagram according to an illustrative aspect of the invention.

FIG. 5 illustrates a block architecture diagram of middleware component 301. Each block within component 301 may be implemented in software, e.g., via computer executable instructions stored in a memory, or via hardware, e.g., as one or more ASICs, or the like. The functional modules illustrated in FIG. 5 are but one possible embodiment, as functionality may be combined across modules, or split to create even more functional modules. Some modules may be optional, and additional modules may be added. The scope of the invention is not limited to the illustrative embodiment of FIG. 5.

As shown in FIG. 5, middleware component 301 may include a usage logging module 503, a scheduling module 505, a file casting module 507, a RTP buffering and recording module 509, an e-commerce module 511, and IPDC manager module 513. Middleware component 301 may further include an electronic service guide (ESG) module 515, a file cast decoder module 517, a key management module 519, digital rights management module 521, radio (e.g., DVB-H) manager module 523, network interface module 525, socket server module 527, IP security key management module 529, and production testing API module 531 (optionally included for device testing during the manufacturing process). In addition, middleware component 301 may interface with data networks 315 (not shown) via data interaction API 317, as well as with the user of the mobile terminal device via end-user interface 533 (e.g., keys, buttons, dials, display screens, speakers, etc., of the mobile terminal device).

Functional API 307 and manager module 513 interface with a broadcast experience application (not shown) as ultimately controlled and/or directed by a user of mobile terminal device 112 via end-user interface 533. A broadcast experience application may include, but is not limited to, an application that consumes real-time content broadcast via a digital multicarrier network, such as DVB-H. In one or more configurations, the broadcast experience application may be programmed to specifically call one or more functions in the library of functional API 307. As such, the broadcast application may invoke one or more of the library functions of functional API 307 in order to achieve a desired result or action.

Manager module 513 controls overall operation of middleware component 301. For example, manager module 513 may initially receive input from the broadcast experience application via the functional API 307, and direct the request to the applicable module of the middleware component, as further described below. Specifically, a broadcast experience application may call various functions and/or methods provided by functional API 307 to request the performance of a particular function or task. For example, a broadcast experience application may schedule a reminder using scheduling module 505 may calling a "SetReminder" method provided by the functional API 307. Upon calling the "SetReminder" method, functional API 307 may communicate with and/or instruct the modules corresponding to the scheduling function (i.e., scheduling module 505). Alternatively, each API request or instruction may be initially routed to manager module 513 which may then relay the request or instruction to the appropriate modules. In another example, a broadcast experience application may invoke a "Download" function in order to receive a requested file. In such a case, function API 307 may direct filecasting module 507 of middleware 301 to retrieve the specified file.

Communication between API 307 and one or more modules of middleware 301 may be facilitated by function call mechanisms provided by the OS (e.g., client-server call, messaging). The various methods and functions of functional API 307 may be made available to a broadcast experience application via traditional methods provided by an underlying operating system and/or programming language. In one or more instances, a library or module of functional API 307 may be linked statically or dynamically to the broadcast experience application. While specific APIs are called out and described herein, those of skill in the art will appreciate that additional or different APIs may be used.

Usage logging module 503, in an illustrative embodiment, tracks and manages which content or programs a user of the mobile terminal device receives. The usage logging module may receive content logging information from the ESG that includes, e.g., what program did the user select, how did the user access the program, when did the user receive and/or watch the program, etc. The usage logging module 503 may collect common login information such as program/service id, start time, stop time etc. and may also collect an URL address or an email address where module 503 can forward the logging information. Each ESG may have a defined field for this logging purpose, and from which field this logging can be activated or deactivated. The logging information may be gathered at any desired time, e.g., periodically, whenever content is requested, etc. The logging information from different devices is gathered by a server (to which module 503 sends logging information), which can analyze statistics of service usage as desired.

The usage logging module 503 might only start to gather logging information upon authorization by the user (i.e., the user grants permission to track his or her content activity). All recipients within a broadcast network may get a tracking request, e.g., through a message such as an SMS sent to the mobile terminal device, in order to activate the logging service. Once activated, the server to which logging information is sent may provide information to the mobile terminal device 112 regarding when tracking should be turned on and turned off. Furthermore, the mobile terminal device may query the user to accept the logging service activation before the logging service can be activated.

The middleware component 301, e.g., via usage logging module 503, may expose one or more usage logging APIs to allow a broadcast experience or user application to control and/or authorize usage logging by the usage logging module 503. For example, an API may allow the broadcast experience application or the user to request the usage logging be started, stopped, authorized, unauthorized, etc., as described herein. In particular, in response to a user command, the broadcast experience application may invoke a usage logging function associated with the API. The API may then, in turn, instruct the usage logging module 503 to begin, halt or authorize/unauthorized logging activities.

Scheduling module 505 provides functionality to schedule event triggers related to ESG-scheduled objects. Scheduling module 505 may manage reminders, recording times, and the like. For example, if a user, through interaction with an electronic program guide, sets a reminder for a specific desired piece of content, such as a TV show, the reminder is managed by and triggered by scheduling module 505. At the time of the desired content, or a predetermined time beforehand, the scheduling module 505 triggers the reminder, which in turn notifies the user via audio and/or video alert of the upcoming broadcast. In one or more configurations, scheduling module 505 and/or middleware component 301 may invoke communication functions of functional API 307 in order to send a notification to the broadcast experience application. Middleware component 301, e.g., via scheduling module 505, may expose one or more scheduling APIs through which a broadcast experience or user application can request content be recorded, played back, set reminders, etc., as described herein.

Filecasting module 507 manages data that is transmitted as files. Filecasting comprises non-real-time broadcasting of audio, video, and data files or their combinations that are to be stored at the receiver for playback or use at a later time. One example of such data files are ESG fragments. Other examples include electronic newspapers and magazines, news clips, ringtones for mobile phones, music files, etc. Filecasting module 507 may manage the download, receipt, and storage of files received from such file services, optionally as decoded by file caster decoder module 517. Middleware component 301, e.g., via filecasting module 507, may expose one or more filecasting APIs through which a broadcast experience or user application can request data be received/downloaded, displayed, used, etc., as described herein.

Real-time Transport Protocol (RTP) buffering and recording module 509 manages RTP data packets as they arrive at mobile terminal device 112. The RTP buffering receives RTP data and allows the data to be replayed by the broadcast experience application. This supports instant replay and time shift types of features. Additionally the module can direct the RTP packets to a file and later they can be played back from the file as if they were received from the network, which supports an optional recording feature. Middleware component 301, e.g., via RTP module 509, may expose one or more RTP APIs through which a broadcast experience or user application can request content be replayed, time-shifted, etc., as described herein.

E-commerce module 511 manages data connections and communications out to data networks, such as the Internet, through which the mobile terminal device obtains information regarding content and/or permissions to receive content. Module 511 may obtain permission information and/or security keys via a bi-directional data network accessible by the mobile terminal device 112. Permission information might include encryption/decryption information for content received in encrypted formats, security keys, etc., which e-commerce module 511 may pass to digital rights management module 521. E-commerce module 511, using known protocols, may also acquire access rights to ESG-related service keys managed by key management protocols such as IPSec and SRTP.

Key management module 519 may operate in conjunction with digital rights management module 521 to manage access rights to specific services and/or content. For example, key management module may receive a security key protecting a some content received via the DVB-H radio receiver, and when authorized, cause the protected first content to be unlocked with the security key for playback via the broadcast experience application. Middleware component 301, e.g., via e-commerce module 511 and/or key management module 519, may expose one or more security APIs through which a broadcast experience or user application can request security keys and/or other authorization to decode and watch certain content, etc., as described herein.

Electronic service guide (ESG) module 515 maintains ESG data including service discovery information and protocol data to search for and find service information within a current service area of the mobile terminal device. Service information may include address information, access information, description of the service, etc. ESG module may use the File Delivery Over Universal Transport (FLUTE) protocol (IETF RFC 3926) and ESG definition to obtain service information. An ESG may carry information on the URL of the specific desired service. As ESG fragments are received, e.g., via filecasting, the ESG module may control the file cast decoder 517 to decode the information. The ESG module may give the filecast decoder module the IP address of a FLUTE session and request the download of the session. Once the download is complete, the ESG module reads the downloaded files and parses them into the ESG database 516. Middleware component 301, e.g., via ESG module 515, may expose one or more ESG APIs through which a broadcast experience or user application can request ESG data be updated, etc., as described herein.

Radio management module 523 manages radio settings of each radio (e.g., radio 141, 142, 143, and/or 144 in FIG. 2) to obtain desired content and/or data. Radio management module 523 may use a radio settings discovery protocol or system to discover location specific parameters for network discovery, e.g., parameters such as start frequencies, end frequencies, bandwidths, etc. A network discovery protocol may be used to discover broadcast services (platforms) offered in a specific location, e.g., the network protocol may include scanning frequencies using the above-mentioned parameters, and reading DVB-H signaling parameters from the received frequencies (channels) where DVB-H service is available. Middleware component 301, e.g., via radio management module 523, may expose one or more radio control APIs through which a broadcast experience or user application can request one or more radios be tuned, scanned, etc., as described herein.

Network interface module 525 and socket server module 527 provide network connectivity as is generally known in the art. Network interface module 525 preferably supports IPv6, although implementations with IPv4 may be possible. The Network interface module may be responsible for translating IP-multicast join messages (IGMP) to DVB-H radio filters. Socket server 527 may implement the IP-stack. When an application opens an IPv6 multicast socket the application tries to join to a multicast group. The join message is received by the network interface module 525 and translated into a filter creation message to the DVB-H radio. The filter may cause specific time-slices to be received and IP-packets to be forwarded to the network interface module 525, which in turn passes them to the IP-stack and the stack sees that the time slices reach the application socket.

Middleware component 301, using one or more of its functional modules, performs a variety of processes, services, and functions to manage discovery and receipt of broadcasting, multicasting, and/or conditional access services. Each mobile terminal device 112, e.g., via middleware component 301, periodically checks to ensure that the electronic service guide data is accurate and reflects the currently available platforms. When the mobile terminal device 112 is powered on it runs an ESG update process to ensure that the mobile terminal device 112 has current ESG information. While mobile terminal device 112 remains within a platform area, the mobile terminal device may, for example, periodically check to ensure that the ESG remains up to date. The mobile terminal device switching network or platform may also invoke an automatic ESG update process. In order to detect service area and platform availability changes, the mobile terminal device 112 may periodically power up various receivers to scan the radio spectrum for available services and platforms. If a platform or network is found, the mobile terminal device 112 may store an indication of the platform or network in a database of known platforms, networks, and/or services. Finally, the mobile terminal device, via middleware component 301, may check, at the request of a broadcast experience application 305, to ensure that the ESG data is accurate. Each platform may have an ESG associated with it, and the mobile terminal device 112 may load ESG data from memory corresponding to a known platform when a new known platform is detected.

In one or more aspects described herein, hardware API 309 (i.e., hardware adaptation layer) may facilitate communication with and/or activation of one or more hardware components needed to perform a certain process or function. Hardware API 309 abstracts hardware dependent tasks or issues from middleware 301 so that middleware 301 is not required to know specific hardware protocols. In particular, hardware API 309 provides a variety of functions and methods that may be called or invoked by middleware 301 to process a particular request or task. Hardware specific protocols and information may reside in hardware API 309 or underlying software (not shown) implementing API 309. Using hardware API 309, the same middleware 301 may be implemented on a variety of systems irrespective of the hardware devices resident on the system. In one example, a user using a mobile communication device to view ESG data may request an update of the information. In response, the viewing application (i.e., a broadcast experience application) may call an update function from functional API 307 which in turn requests updated data from ESG component 516. ESG component 516 may coordinate with radio management module 523 to then invoke one or more radio or communication functions of hardware API 309 that provides the appropriate hardware level instructions to the radio or communication component of the device. Similarly, when the updated ESG data is received by the radio or communication component of the device, the component may send the ESG data to radio management module 523 and/or ESG component 516 via hardware API 309.

Figure 6:
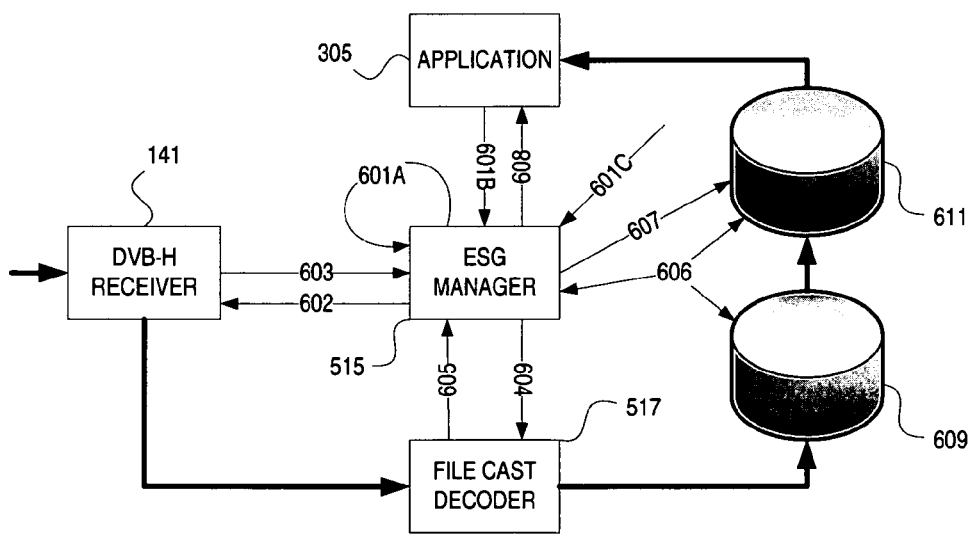
FIG. 6 illustrates a data flow diagram according to an illustrative aspect of the invention.

FIG. 6 illustrates a data flow diagram during an electronic service guide update process. The heavy lines running in sequence from elements 141, 517, 609, 611, and 305 in FIG. 6 represent the data flow of the electronic service guide data. The lighter lines represent data flow of control/management messages during the ESG update process. In step 601 the ESG manager 515 receives a request to update the ESG. The request may come as a result of various actions. ESG manager 515 may detect (601A) an ESG change signal broadcast via a broadcast network with which the mobile terminal device 112 is in communication. For example, radio management module 523 (FIG. 5) may detect such a change signal broadcast via hardware API 309 (FIG. 5) and send an appropriate notification to ESG manager 515. ESG manager 515 may alternatively receive an ESG update request from broadcast experience application 305 (601B), or ESG manager 515 may receive an automatic ESG update message (601C).

In step 602 the ESG manager 515 instructs the DVB-H receiver 141 to provide ESG address information. The DVB-H receiver 141 provides the ESG address information to the ESG manager 515. In step 604 ESG manager 515 instructs the file decoder module 517 to obtain the ESG data via DVB-H receiver 141 using the ESG address provided by the ESG manager 515. The file cast decoder module 517 passes the ESG data to file system 609, and in step 605 sends a message to ESG manager module 515 indicating that the ESG data has been obtained and stored. In step 606 the ESG manager module 515 compares the received files to the ESG data in the ESG database 611 and as a result of the comparison, in step 607 the ESG manager module 515 instructs the ESG database 611 to update the ESG using the new ESG data stored in file system 609. Finally, in step 608, the ESG manager module 515 instructs the broadcast experience application 305 that the ESG has been updated, and the application 305 may obtain the updated ESG from the ESG database 611 for presentation to the user.

Figure 7:
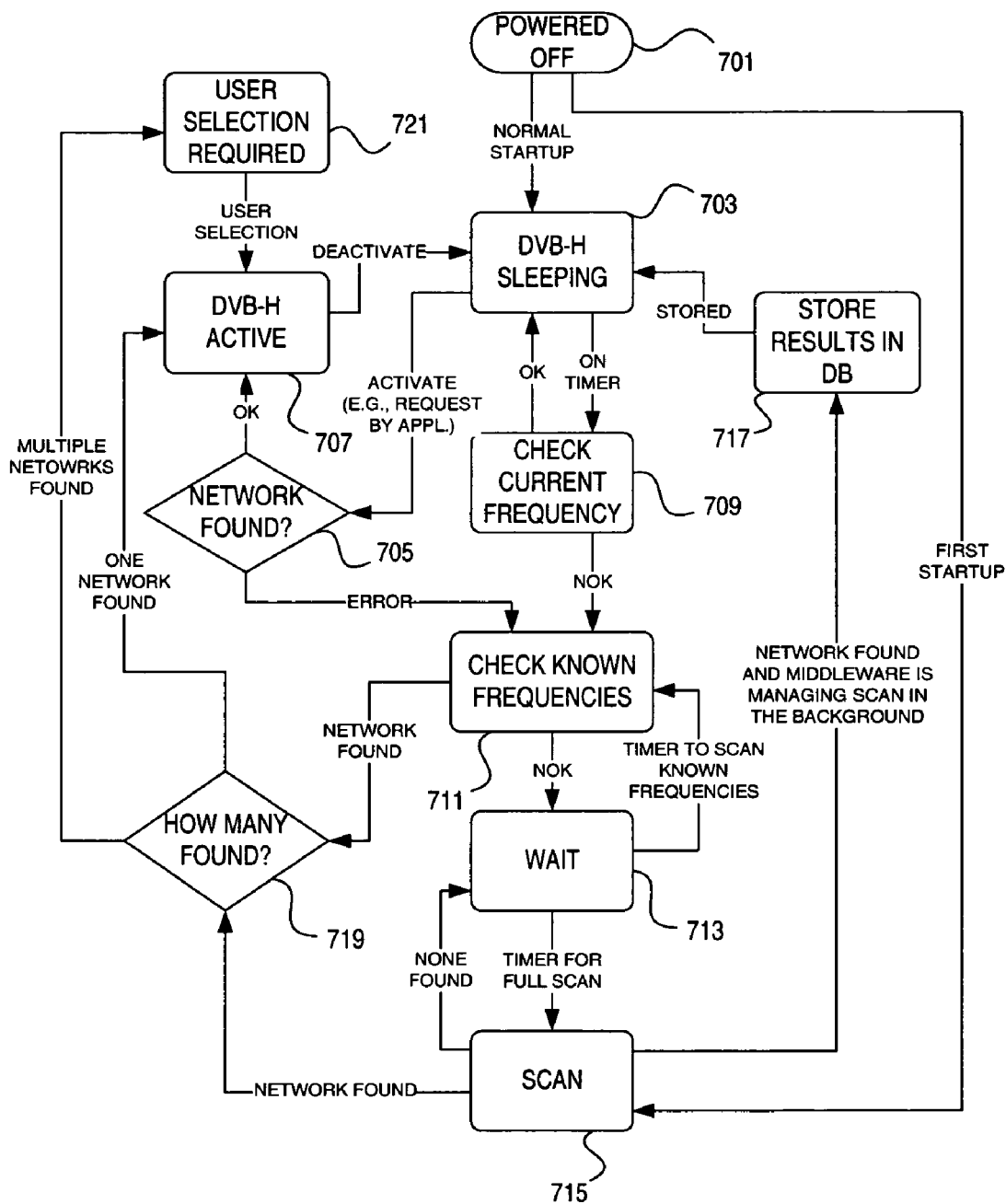
FIG. 7 illustrates a state diagram according to an illustrative aspect of the invention.

FIG. 7 illustrates a flow chart state diagram according to an illustrative aspect of the invention. The flow chart state diagram illustrates various states and decisions of middleware component 301. Initially in state 701, mobile terminal device 112 is powered down. When turned on, if it is the first time a mobile terminal device has been powered up, the middleware 301 proceeds to state 715 to scan for available platforms/networks. If the power up is not the first power up for the mobile terminal device 112, then middleware 301 proceeds to state 703, where the DVB-H receiver is in a sleeping state. From state 703, upon expiration of a timer having a predetermined duration, middleware 301 initiates a platform check on the current frequency in state 709. If an expected platform (one which the mobile terminal device has received before) is found, middleware returns to state 703. If the expected platform is not found in state 709, as indicated by symbol NOK (Not OK), then middleware 301 proceeds to state 711 where it initiates a scan for platforms/networks on other known frequencies.

If in step 711, the mobile terminal device detects one or more networks/platforms on known frequencies, then middleware proceeds to state 719. If in state 711 no networks/platforms are detected, then middleware 301 proceeds to state 713 to wait for a timer to expire to initiate another scan. From state 713, two timers may trigger another scan. A first time may correspond to scanning for known networks and/or scanning on known frequencies, in which case middleware returns to state 711. A second time may correspond to a full spectrum scan to detect any known or unknown network and/or platforms, in which case middleware proceeds to state 715. In state 715 middleware 301 may cause the mobile terminal device, via one or more of its radios, to perform a complete spectrum scan for any available network and/or platform on any radio. If a new network is found then middleware 301 may perform one of two options, depending on the whether the scan was performed automatically in the background of whether the scan was performed at the request of a user and/or application program. If performed in the background, middleware 301 may proceed to step 717 and update its database of known networks/platforms, and then return to state 703.

If state 715 results from an explicit request for a network scan, the middleware proceeds to state 719 to determine how many networks/platforms were found. If only one was found, the middleware proceeds directly to state 707. If multiple networks/platforms are found, then middleware proceeds to state 721 to allow a user to select the network/platform to which middleware should tune. In state 721, the user may in fact be an application program such as a broadcast experience application, as the user of the middleware component. Upon selection in state 721, middleware proceeds to state 707. The device may also update the database as in state 717, e.g., with the program specific information/service information (PSI/SI) for the identified platform(s) and/or network(s).

When mobile terminal device 301 is powered up as normal and DVB-H is in sleep mode (state 703), middleware 301 may activate or awaken the mobile terminal device, e.g., resulting from user input, and proceed to state 705. In state 705 middleware checks for an expected network. If not found, middleware proceeds to state 711, discussed above. If the expected network is found, then middleware 301 proceeds to state 701. From state 707, when the mobile terminal device 112 becomes deactivated, e.g., by going into sleep mode, middleware 301 proceeds back to state 703.

Figure 8:
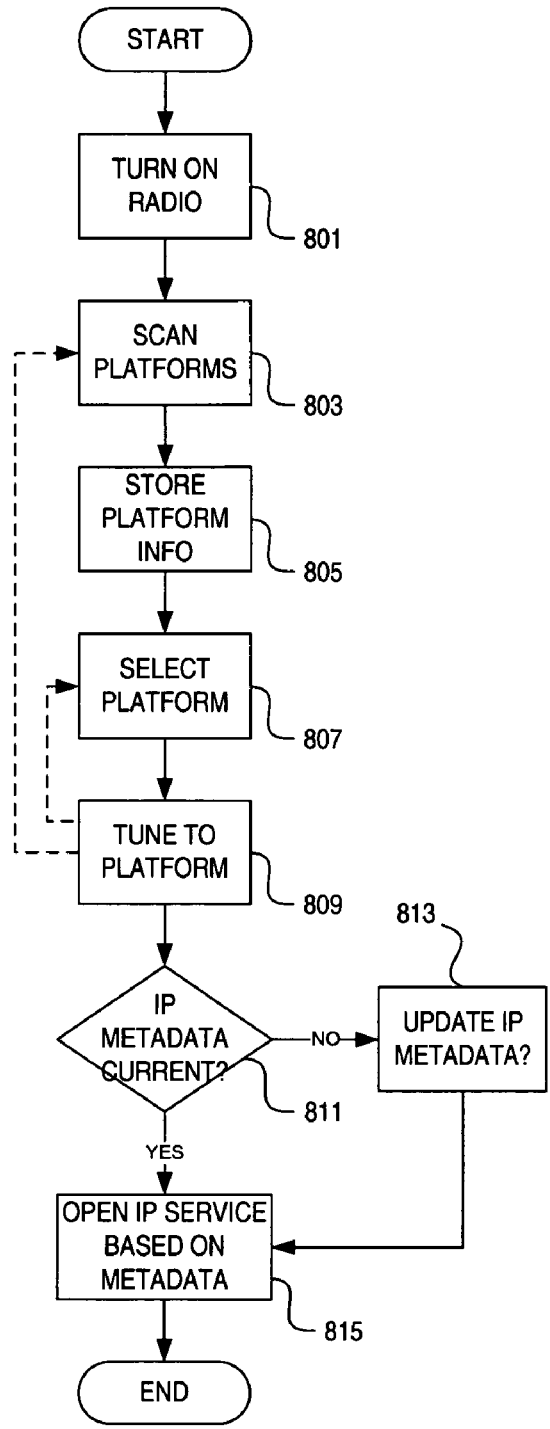
FIG. 8 illustrates a flow chart according to an illustrative aspect of the invention.

According to an illustrative aspect of the invention, middleware 301 may perform various methods based on the flow chart state diagram illustrated in FIG. 7. FIG. 8 illustrates an example of a method for obtaining platform settings. In step 801, the radio is powered on, e.g., as a result of the user turning on the mobile terminal device 112, or as a result of the mobile terminal device being awakened from sleep mode. The mobile terminal device may awaken from sleep mode for any number of reasons, such as the user pressing a key or providing other input (e.g., opening a clamshell-type phone), or as a result of the expiration of a timer indicating that a periodic platform scan should be performed. In step 803 the mobile terminal device 301 scans for available platforms, starting with a current platform, when known, then scanning known frequencies, and finally performing a spectrum scan for all available platforms. Information regarding any new platforms identified in step 803 are stored in memory in step 805, e.g., PSI/SI data. When multiple available platforms have been identified in step 803, a single platform may be selected in step 807. The selection may be made by a human user or a software user of middleware 301. For example, a broadcast experience application that allows a user of the mobile terminal device 112 to watch mobile TV might automatically select a known DVB-H platform when available.

In step 809 the middleware 301 causes the mobile terminal device 112 to tune to the selected platform. In step 811 the middleware 301 determines whether IP metadata for a desired service over the selected platform is current and, if so, proceeds to step 815, whereas if not, middleware 301 updates the IP metadata in step 813 before proceeding to step 815. In step 815 the middleware opens the selected service based on the IP metadata, and the user might then be able to select content, at his or her leisure, for viewing on the mobile terminal device 112.

Those of skill in the art will appreciate that variations to the flowchart of FIG. 8 are possible, e.g., as illustrated in broken lines. As illustrated in FIG. 8, middleware 301 might proceed from step 809 back to step 803, e.g., at the expiration of a timer which indicates that another scan should be performed. Alternatively, middleware 301 might return to step 807 from step 809 when the user/application provides additional information about the selected platform.

Figure 9:
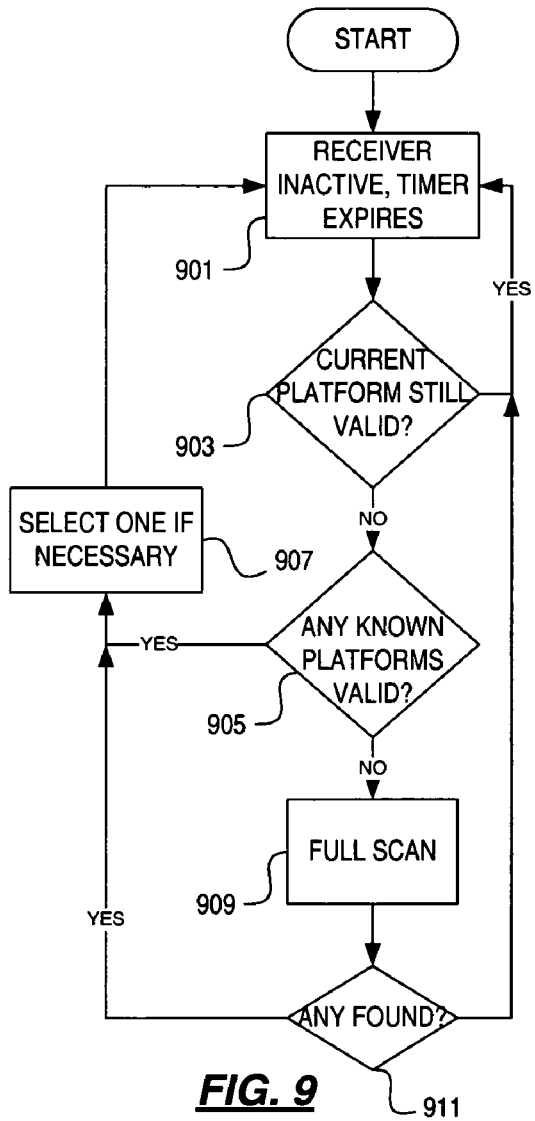
FIG. 9 illustrates a flow chart according to an illustrative aspect of the invention.

FIG. 9 illustrates another illustrative method that may be performed by middleware 301 to maintain an active platform. In step 901 middleware 301 initiates a routine scan, e.g., resulting from a timer expiring and firing a trigger to perform the scan. In step 903 middleware 301 scans the current platform (e.g., a last used platform, or a last connected platform) and checks whether the current platform is still valid (e.g., is still being received). If so, middleware 301 restarts the timer and returns to step 901. If not, then middleware 301 proceeds to step 905 to scan all known platforms in the present location, e.g., by scanning all frequencies on which a platform has been received in the past in the mobile terminal device's present geographic location, e.g., based on network ID, base station ID, GPS coordinates, etc.

If in step 905 one or more known platforms are found, then middleware 301 proceeds to step 907 to select one of the available platforms (if more than one were found). If in step 905 no known platforms were found, the middleware proceeds to step 909 to perform a full spectrum scan on one or more radios to locate any available platform, known or unknown. In step 911 middleware determines whether any were found and, if so, proceeds to step 907. If none were found in step 909, then from step 911 middleware resets the timer and returns to step 901. In step 907 middleware allows a user (human or software application) to select a platform when more than one was identified in step 905 or 911, as applicable.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended embodiments.

We claim:

1. An apparatus comprising:
   a processor; and
   memory operatively coupled to the processor and storing computer executable instructions which, when executed, provide a middleware component accessible by an application configured to consume one or more broadcast services available through a broadcast network, said middleware component configured to control a digital multicarrier radio receiver, and said middleware component comprising:
   one or more application program interfaces (API) through which the application provides first control information to the middleware component, and through which the middleware component returns service information to the application, wherein the service information identifies the one or more broadcast services;
   a hardware adaptation layer through which the middleware component provides second control information to the digital multicarrier radio receiver, and through which the middleware component receives input from the digital multicarrier receiver; and
   a management module controlling discovery of the one or more broadcast services transmitted with digital multicarrier signals using a discovery protocol for finding said one or more services via the digital multicarrier radio receiver.

2. The apparatus of claim 1, wherein the middleware component further comprises a scheduling component that is configured to schedule an event based on electronic service guide (ESG) data.

3. The apparatus of claim 2, wherein the event comprises a reminder notice providing a notification that user-selected content is scheduled to begin.

4. The apparatus of claim 1, wherein the middleware component further comprises a filecasting module configured to receive a data file via the digital multicarrier radio receiver.

5. The apparatus of claim 4, wherein the data file comprises an ESG fragment.

6. The apparatus of claim 4, wherein the filecasting module receives the data file using File Delivery over Unidirectional Transport (FLUTE) protocol.

7. The apparatus of claim 1, wherein the middleware component further comprises a key management module that is configured to receive a security key protecting a first content received via the digital multicarrier radio receiver, and when authorized, causing the protected first content to be unlocked with the security key for playback via the application.

8. The apparatus of claim 7, wherein the middleware component further comprises an e-commerce module configured to obtain the security key via a bi-directional data network.

9. The apparatus of claim 1, wherein the digital multicarrier radio receiver comprises a Digital Video Broadcast-Handheld (DVB-H) receiver, and the service comprises a DVB-H service.

10. A method comprising:
    in a middleware component of an apparatus:
    initiating powering on of a radio configured to wirelessly receive data from a broadcast network;
    instructing the radio to scan a radio spectrum receivable by the radio to detect one or more available broadcast services in the broadcast network;
    recording in a platform database program specific information/service information (PSI/SI) data corresponding to the one or more services available over the broadcast network;
    receiving an instruction from an application configured to consume the one or more available broadcast services;

tuning the radio to receive the available broadcast network in accordance with the instruction;

providing a service identifier to an electronic service guide (ESG) module of the middleware component, wherein the service identifier corresponds to a service of the one or more available services; and the ESG module downloading ESG data corresponding to the service identifier.

11. The method of claim 10, wherein after expiration of a predetermined amount of time, the middleware component causes the radio to rescan the radio spectrum for a new available broadcast network.

12. The method of claim 10, wherein the radio comprises a Digital Video Broadcast-Handheld (DVB-H) radio, and wherein the available broadcast network comprises a DVB-H network.

13. The method of claim 10, wherein downloading the ESG data includes using a File Delivery over Unidirectional Transport (FLUTE) protocol to obtain ESG fragment files.

14. One or more computer readable media storing computer-executable instructions that, when executed, provides a middleware component accessible by an application configured to consume one or more broadcast services in a broadcast network, said middleware component comprising:

one or more application program interfaces (API) configured to provide first control information from the application to the middleware component, and to return service information from the middleware component to the application, the service information corresponding to the one or more broadcast services;

a hardware adaptation layer configured to provide second control information from the middleware component to a digital multicarrier radio receiver, and to provide input from the digital multicarrier receiver to the middleware component; and a management module configured to control discovery of the one or more broadcast services transmitted with digital multicarrier signals using a discovery protocol for finding said one or more broadcast services via the digital multicarrier radio receiver.

15. The one or more computer readable media of claim 14, the middleware component further comprising:

an electronic service guide (ESG) management module storing computer executable instructions for discovering service information corresponding to a first broadcasting service available in a geographic area of a mobile terminal in which the middleware component resides.

16. The one or more computer readable media of claim 15, wherein the digital multicarrier radio comprises a Digital Video Broadcast-Handheld (DVB-H) radio.

17. The one or more computer readable media of claim 16, wherein the discovery of the one or more broadcast services is performed using location specific parameters, the location specific parameters comprising a start frequency, an end frequency, and a bandwidth.

18. The one or more computer readable media of claim 17, wherein the management module is configured to discover the one or more broadcast services by scanning frequencies using the location specific parameters, and reading signaling parameters from the start and end frequencies, when received.

19. The one or more computer readable media of claim 16, wherein the ESG management module receives the service information using a File Delivery over Unidirectional Transport (FLUTE) protocol and an ESG definition.

20. The one or more computer readable media of claim 19, wherein the ESG management module is further configured to receive the service information as ESG fragments decoded by a filecasting module of the middleware component.

21. The one or more computer readable media of claim 16, wherein the middleware component further comprises a scheduling module configured to schedule a reminder corresponding to a user-selected content received via a discovered broadcast service.

22. The one or more computer readable media of claim 16, further comprising a key management module configured to receive and manage a security key protecting a first content receivable via the DVB-H radio.

23. The one or more computer readable media of claim 22, further comprising an e-commerce module configured to acquire the security key via a bi-directional data network accessible by the mobile terminal.

24. A method comprising:

receiving, at a middleware apparatus, first control information from an application through one or more application program interfaces (API), wherein the application is configured to consume one or more broadcast services in a broadcast network and wherein the first control information corresponding to accessing the one or more broadcast services;

providing, by the middleware apparatus, second control information to a digital multicarrier radio receiver through a hardware adaptation layer based on the first control information;

receiving input from the digital multicarrier radio receiver through the hardware adaptation layer; and discovering from the input at least one broadcast service received in a digital multicarrier signal using a discovery protocol for finding said at least one broadcast service.

25. The method of claim 24 further including:

recording in a platform database program specific information/service information (PSI/SI) data corresponding to the available broadcast network; and tuning the digital multicarrier radio to receive the available broadcast network.

26. The method of claim 25, further comprising:

providing a service identifier corresponding to the at least one broadcast service to an electronic service guide (ESG) module; and downloading ESG data corresponding to the service identifier.

27. The method of claim 26, further comprising:

causing the digital multicarrier radio to rescan a radio spectrum for a new available broadcast network after expiration of a predetermined amount of time.

28. The method of claim 26, wherein the available broadcast network comprises a Digital Video Broadcast-Handheld (DVB-H) network.

29. The method of claim 26, wherein downloading the ESG data includes utilizing a File Delivery over Unidirectional Transport (FLUTE) protocol to obtain ESG fragment files.

30. An apparatus comprising:

a processor; and memory storing computer readable instructions that, when executed, cause the apparatus to:

receive, at a middleware module, first control information from an application through one or more application program interfaces (API), wherein the application is configured to consume one or more broadcast services in an available broadcast network and wherein the first control in formation corresponds to accessing the one or more broadcast services;

provide second control information to a digital multicarrier radio receiver through a hardware adaptation layer based on the first control information;

receive input from the digital multicarrier radio receiver through the hardware adaptation layer; and discover from the input at least one broadcast service received in a digital multicarrier signal using a discovery protocol for finding said at least one broadcast service.

31. The apparatus of claim 30, wherein the at least one service corresponds to an available broadcast network and wherein the computer readable instructions, when executed, further cause the apparatus to:

record in a platform database program specific information/service information (PSI/SI) data corresponding to the available broadcast network; and tune the digital multicarrier radio to receive the at least one service of the available broadcast network.

32. The apparatus of claim 31, wherein the computer readable instructions, when executed, further cause the apparatus to:

provide a service identifier corresponding to the at least one service to an electronic service guide (ESG) module; and download ESG data corresponding to the service identifier.

* * * * *